United States Patent
Varshneya et al.

(10) Patent No.: US 7,603,041 B2
(45) Date of Patent: Oct. 13, 2009

(54) TEMPERATURE COMPENSATED DYNAMIC OPTICAL TAG MODULATOR SYSTEM AND METHOD

(75) Inventors: Deepak Varshneya, Del Mar, CA (US); Larry Jeffers, Minerva, OH (US)

(73) Assignee: Cubic Corporation, San Diego, CA (US)

(*) Notice: Subject to any disclaimer, the term of this patent is extended or adjusted under 35 U.S.C. 154(b) by 565 days.

(21) Appl. No.: 11/150,828

(22) Filed: Jun. 9, 2005

(65) Prior Publication Data

US 2006/0280505 A1  Dec. 14, 2006

(51) Int. Cl.
*H04B 10/00* (2006.01)

(52) U.S. Cl. .................................................. 398/170

(58) Field of Classification Search ............ 398/130, 398/168–170
See application file for complete search history.

(56) References Cited

U.S. PATENT DOCUMENTS

| | | | | |
|---|---|---|---|---|
| 3,710,122 A * | 1/1973 | Burcher et al. | ............ | 398/106 |
| 4,673,299 A * | 6/1987 | Dakin | ............ | 374/131 |
| 5,121,242 A * | 6/1992 | Kennedy | ............ | 398/170 |
| 5,394,489 A * | 2/1995 | Koch | ............ | 385/14 |
| 5,539,565 A * | 7/1996 | Waddoups et al. | ............ | 398/170 |
| 5,615,037 A * | 3/1997 | Betts et al. | ............ | 398/170 |
| 5,815,295 A * | 9/1998 | Darcie et al. | ............ | 398/72 |
| 6,016,212 A * | 1/2000 | Durant et al. | ............ | 398/131 |
| 6,154,299 A * | 11/2000 | Gilbreath et al. | ............ | 398/170 |
| 6,403,949 B1 * | 6/2002 | Davis et al. | ............ | 250/227.27 |
| 6,525,826 B2 * | 2/2003 | De Groot et al. | ............ | 356/517 |
| 6,559,987 B2 * | 5/2003 | Liu | ............ | 398/79 |
| 6,661,974 B1 * | 12/2003 | Akiyama et al. | ............ | 398/95 |
| 7,308,207 B2 * | 12/2007 | Chen | ............ | 398/170 |
| 7,327,957 B2 * | 2/2008 | Lee et al. | ............ | 398/82 |
| 2002/0021462 A1 * | 2/2002 | Delfyett et al. | ............ | 359/123 |
| 2002/0063927 A1 * | 5/2002 | Ofek et al. | ............ | 359/128 |
| 2002/0181080 A1 * | 12/2002 | Lim | ............ | 359/337.1 |
| 2003/0012244 A1 * | 1/2003 | Krasulick et al. | ............ | 372/50 |
| 2004/0027634 A1 * | 2/2004 | Bond et al. | ............ | 359/240 |
| 2004/0179855 A1 * | 9/2004 | Harada | ............ | 398/197 |
| 2005/0158059 A1 * | 7/2005 | Vaananen | ............ | 398/183 |
| 2006/0002438 A1 * | 1/2006 | Brown | ............ | 372/32 |
| 2006/0060651 A1 * | 3/2006 | McIntyre et al. | ............ | 235/454 |
| 2006/0215147 A1 * | 9/2006 | Scott et al. | ............ | 356/4.01 |
| 2006/0222375 A1 * | 10/2006 | Raddatz | ............ | 398/195 |
| 2006/0239609 A1 * | 10/2006 | Sorin et al. | ............ | 385/24 |
| 2007/0177880 A1 * | 8/2007 | Karasikov et al. | ............ | 398/170 |

* cited by examiner

*Primary Examiner*—Shi K Li
(74) *Attorney, Agent, or Firm*—Townsend, Townsend & Crew LLP (57) ABSTRACT

A dynamic optical tag system and method that allows for operation over a wide temperature range. A variable wavelength optical source, such as a dual wavelength fiber laser, is generated by combining the outputs from two distributed feedback lasers having separate operating wavelengths using a wavelength division multiplexer (WDM). A quantum well optical modulator mounted on the front surface of a retroreflector in the remote receiver end of the communication link is biased to modulate one of the two laser wavelengths. At higher temperatures, the optical modulator can be biased to operate at the wavelength of one of the two lasers. At a lower temperature, the optical modulator can be biased to operate at the second of the two wavelengths. The DC bias required to tune the optical modulator is reduced by operating at two separate wavelengths depending on temperature.

9 Claims, 6 Drawing Sheets

TEMPERATURE COMPENSATED DYNAMIC OPTICAL TAG MODULATOR SYSTEM AND METHOD

STATEMENT AS TO RIGHTS TO INVENTIONS MADE UNDER FEDERALLY SPONSORED RESEARCH OR DEVELOPMENT

This invention was made with government support under Contract Number H92222-04-C-0004 awarded by the United States Special Operations Command. The government has certain rights in the invention.

BACKGROUND OF THE INVENTION

An optical communication system, such as a free space optical communication system, can use modulated optical signals to convey information. The optical signal can be generated by an optical source having a relatively narrow spectral bandwidth, such as a laser.

A laser optical source can be optically modulated using any one of a variety of methods. For example, the laser output can be optically modulated internal to the laser by modulating a current to the laser. The current can affect the light intensity of the laser output according to a characteristic light to current curve. An alternative to internally modulating the bias current of the laser is to utilize an external optical modulator positioned in the output optical signal path of the laser.

A quantum well optical modulator that utilizes electro-absorption to modulate the optical signal can be configured to provide relatively high modulation index while simultaneously supporting high modulation bandwidths. A drawback to such modulators is that their modulation characteristics are quite temperature dependent. The temperature effects can be compensated by the application of a DC bias voltage in addition to the AC modulation voltage.

In optical communication systems that are specified to operate over a relatively large temperature range, the magnitude of a reverse bias voltage applied to the modulator may change drastically. For example, to operate an electro-absorption optical modulator over a temperature range of −40° C. to +70° C. may require a reverse bias voltage that ranges from 40 volts to greater than 90 volts.

It is extremely difficult to manufacture a quantum well optical modulator having a high breakdown voltage. In particular, it is difficult to manufacture an electro-absorption optical modulator that is able to withstand an 90 volt reverse voltage bias at a high manufacturing yield.

Increasing the yield of high breakdown voltage optical modulators would likely entail complex Metal-Organic Chemical Vapor Deposition (MOCVD) growth processes and epitaxial wafer design controls. The technology and development time and costs required to produce a high breakdown voltage optical modulator makes it unsuitable for application in optical communication systems that require immediate low cost solutions.

BRIEF SUMMARY OF THE INVENTION

A dynamic optical tag system and method that allows for operation over a wide temperature range is disclosed. A variable wavelength optical source, such as a dual wavelength fiber laser, is generated by combining the outputs from two distributed feedback lasers having separate operating wavelengths using a wavelength division multiplexer (WDM).

The combined output can be provided to a fiber amplifier for amplification to a desired power level. However, typically only one of the optical sources is activated. In operation, the final output of the fiber laser can be one wavelength or the other. The output wavelength is determined by which of the two DFB lasers is powered.

A transmissive quantum well optical modulator mounted on the front surface of a retro-reflector (corner cube) in the remote receiver end (Tag) of the communication link is biased to optimize the modulation of one of the two laser wavelengths. At higher temperatures, the optical modulator can be biased to operate at the wavelength of one of the two lasers. At a lower temperature, the optical modulator can be biased to operate at the second of the two wavelengths. The DC bias required to tune the optical modulator is reduced by operating at two separate wavelengths depending on the temperature of the modulator.

Embodiments of the invention include an apparatus for use in an optical communication system that includes a variable wavelength optical source having an optical output, an information input module configured to generate a first modulating signal, an optical receiver, and a control module coupled to the information input module and the optical receiver, modulate the optical output of the variable wavelength optical source at each of a plurality of operating wavelengths based on the first modulating signal, and control an operating wavelength of the variable wavelength optical source based on a response message received by the optical receiver in response to the modulated optical output at one of the plurality of operating wavelengths.

Embodiments of the invention also include an apparatus for use in an optical communication system that includes a first laser having an output and configured to operate at substantially a first wavelength, a second laser having an output and configured to operate at substantially a second wavelength distinct from the first wavelength, a signal combiner configured to couple the output of the first laser and the output of the second laser to a combiner output, a control module configured to selectively activate one of the first laser and second laser, and an optical receiver configured to receive a response message at one of the first wavelength or the second wavelength and wherein the control module selects one of the first laser or the second laser for further communications.

Embodiments of the invention include an apparatus for use in an optical communication system that includes a quantum well modulator having a modulation input, and a modulator drive module coupled to the quantum well modulator and configured to determine a DC bias to apply to the modulation input based on a temperature.

Embodiments of the invention also include a method of generating an optical output that includes monitoring a temperature, controlling a DC bias for an optical modulator based in part on the temperature, and applying a modulating signal having the DC bias to the optical modulator.

Embodiments of the invention also include a method of generating an optical signal at a desired optical wavelength that includes generating a first interrogation signal at a first wavelength, searching for a response message received in response to the first interrogation signal, generating a second interrogation signal at a second wavelength, searching for a response message received in response to the second interrogation signal, and activating an optical source at one of the first or second wavelength based on the response message.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE INVENTION

An optical transmitter and method of generating a pulsed optical output for a Dynamic Optical Tag (DOT) system that is configured to operate over an extended temperature range is disclosed. The pulsed optical output can be received by a remote Tag, where the received optical signal is retro-modulated by an optical modulator and reflected back to the optical transmitter. The DOTs system can be implemented using an optical modulator having a reduced reverse breakdown voltage requirement. The lower reverse breakdown voltage requirement allows for a greater yield of optical modulators and a reduced manufacturing cost. A quantum well modulator having the reduced reverse breakdown voltage requirements can be manufactured with a yield exceeding 70% while quantum well modulators requiring reverse breakdown voltages of 90 volts or greater typically have a manufacturing yield less than 10%.

The optical source can use two Distributed Feedback (DFB) lasers operating at distinct wavelengths. The output from the two lasers can be combined using a wavelength division multiplexer (WDM) to produce a combined optical signal that can be coupled into an optical fiber. A first laser can operate, for example, at a wavelength of substantially 1562 nm and a second laser can operate at a wavelength of substantially 1532 nm. Each laser can be temperature stabilized, for example, by using a thermal electric cooler to maintain its wavelength or to reduce a temperature induced wavelength variation experienced by a laser due to changes in the ambient conditions.

Each laser can be configured to operate over a portion of a temperature range, where the temperature refers to the temperature of a Tag. The optical source can determine the wavelength of operation using, for example, a search routine. The optical source can search for the desired wavelength of operation and need not have explicit knowledge of the temperature of the Tag. The operating temperature ranges can be distinct or overlapping.

The combined optical output power can be modulated via current control to the selected DFB laser to encode a message on the outgoing beam in order to communicate information to the remote Tag receiver. The retro-modulator in the Tag can modulate a series of carrier pulses from the source in order to convey information back to the source. The parameters of a modulation signal applied to the optical modulator can be determined based on the temperature of the modulator and the wavelength of the optical signal being modulated. The laser's wavelength can be selected or otherwise controlled to minimize the bias voltage that is required at the optical modulator.

The response curve of the optical modulator can shift with temperature, and the optical source can transition the optical source from a first laser to a second laser such that the bias voltage applied to the optical modulator is maintained below a predetermined limit.

The combined laser outputs can be amplified in a single fiber amplifier. An optical circulator can be positioned at the output of the fiber amplifier to help achieve the high gain and peak powers for efficient lasing.

Figure 1:
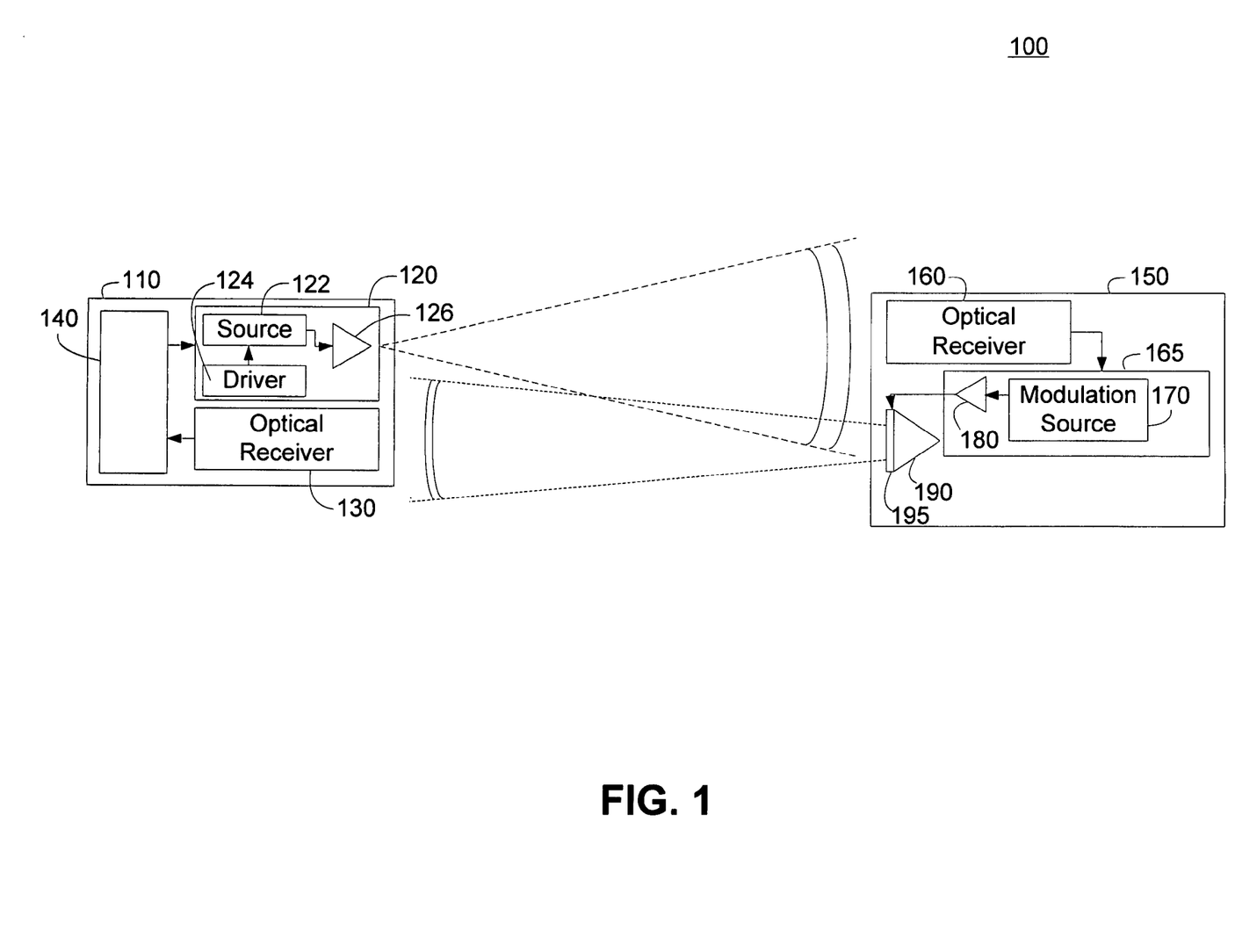
FIG. 1 is a simplified functional block diagram of an embodiment of an optical communication system.

The dual wavelength optical source can be implemented within a variety of optical communication systems. FIG. 1 is a simplified functional block diagram of an embodiment of a free space optical system 100 that can utilize the disclosed optical source and method of generating a modulated optical signal. Although the free space optical communication system 100 of FIG. 1 is illustrated as a system that transmits information through the use of retro-modulation, use of retro-modulation is not a limitation of a free space optical communication system 100. Another embodiment of the free space optical communication system 100 can use independent transceivers that each include receivers and optical sources, and retro-modulation of an incident signal can be omitted. Other embodiments of the free space optical communication system 100 can be configured for unidirectional information transfer. In such an embodiment, an optical source may be configured to transmit an optical signal across a free space optical channel to one or more optical receivers, which may not have the ability to transmit optical signals.

The optical communication system 100 can include a first transceiver 110 that is configured to generate a modulated optical signal. The modulated optical signal can be transmitted to a second transceiver 150, for example, via a free space optical channel. The second transceiver 150 can be configured to receive the optical signal and can be configured to generate a return optical signal. In the configuration shown in FIG. 1, the second transceiver 150 is configured to include a retro-modulator that can operate to modulate and return a portion of the incident optical signal.

The first transceiver 110 can include an optical transmitter 120 configured to generate an outgoing optical signal and an optical receiver 130 configured to receive the retro-modulated optical signal, or some other received optical signal. The optical transmitter 120 can include an optical source 122 that can include a laser. Embodiments of the optical source 122 are discussed in more detail below.

The output of the optical source 122 can be controlled by a driver 124 that can be configured to modulate the optical signal by modulating a current to the laser. For example, the driver 124 can be configured to pulse the current to the optical source 122 to create a pulsed optical output signal. The driver 124 can be configured to receive a first modulation signal from a first data source, such as a data and control module 140. The first modulation signal can be, for example, data or information that is to be sent to a receiver 160 local to the second transceiver 150.

The modulated optical signal can be coupled from the optical source 122 to an optical amplifier 126 that can be configured to amplify the modulated optical signal before coupling the transmit signal to the appropriate optical channel.

The second transceiver 150 can be configured to receive the modulated optical signal over the optical channel. In the embodiment shown in FIG. 1, the second transceiver 150 includes a receiver 160 coupled to a retro-modulator and modulator drive module 165. The modulator drive module 165 can include a modulation data source 170. The retro-modulator can include a corner cube reflector 190 that has a quantum well optical modulator 195 mounted on the front surface of the corner cube reflector 190.

The receiver 160 can be configured to receive the pulsed optical signal from the optical channel and can recover the first modulation signal. The receiver 160 can determine, for example, if at least a portion of the first modulation signal corresponds to a predetermined signal or sequence. The receiver 160 can also recover information and data that is included in a portion of the first modulation signal. If the receiver 160 determines that the received signal corresponds to the predetermined signal or sequence, the receiver 160 can activate the retro-modulator and can control the modulation drive module 165 to modulate the received optical signal using the second modulation signal provided by the modulation data source 170.

The modulation data source 170 can, for example, drive an amplifier 180 with a modulation signal that is provided to the quantum well modulator 195 positioned on a front surface of the corner cube reflector 190 to retro-modulate the incident optical signal. The retro-modulator can modulate the incident optical signal with the second modulation signal and can reflect the modulated optical signal back along the direction of the incident optical signal. In this manner, the second transceiver 150 is not required to include an optical signal source.

In one embodiment, the optical communication system 100 can be configured as a Dynamic Optical Tag (DOT) system that can also be configured as an Identification as Friend-or-Foe (IFF) system for use in a battlefield or in combat simulation. Examples of an optical IFF system are provided in U.S. patent application Ser. No. 10/066,099 filed Aug. 7, 2003, assigned to the assignee of the present application, and hereby incorporated herein by reference in its entirety.

In a combat identification as friend or foe (IFF) system, the first transceiver 110 can be a combat interrogatory unit that can be positioned in a weapon-mounted disposition. A challenging soldier may target a second transceiver 150 positioned on a target. In one embodiment, the second transceiver 150 can be a helmet-mounted combat response unit worn by a soldier in a combat simulation exercise or in actual combat.

An infrared (IR) transmit signal can be projected by an optical source upon operator command. The transmit signal radiates outward along a narrow beam, eventually illuminating the response unit. For example, the transmit signal may be embodied as a 6 milliradian beam of Infrared (IR) light. The IR light illuminates an area of about 6 meters on a side at a typical weapon range limit of 1000 meters.

Upon being received, detected and verified at a response unit, the transmit signal can be retro-reflected back to interrogatory unit as a response signal. For a 6 milliradian transmit signal, a response signal can include a reflection of, for example, a 1.5 centimeter portion of the 6 meter transmit beam. This 1.5 cm reflected portion can include about 0.002 percent (−47 dB) of the initial energy of transmit signal. This energy can be generally reflected back to interrogatory unit by a precision retro-reflector. Response signal can be received at interrogatory unit reduced by an additional transmission loss of typically −8 dB, which leaves sufficient power for IFF detection and processing at interrogatory unit. The IR wavelength is provided merely as an example, although such a wavelength may be preferred because it is considered to be eye-safe and has relatively low absorption and scattering loss in the usual battlefield smoke and haze and natural obscurations such as rain, snow, and fog.

Figure 2:
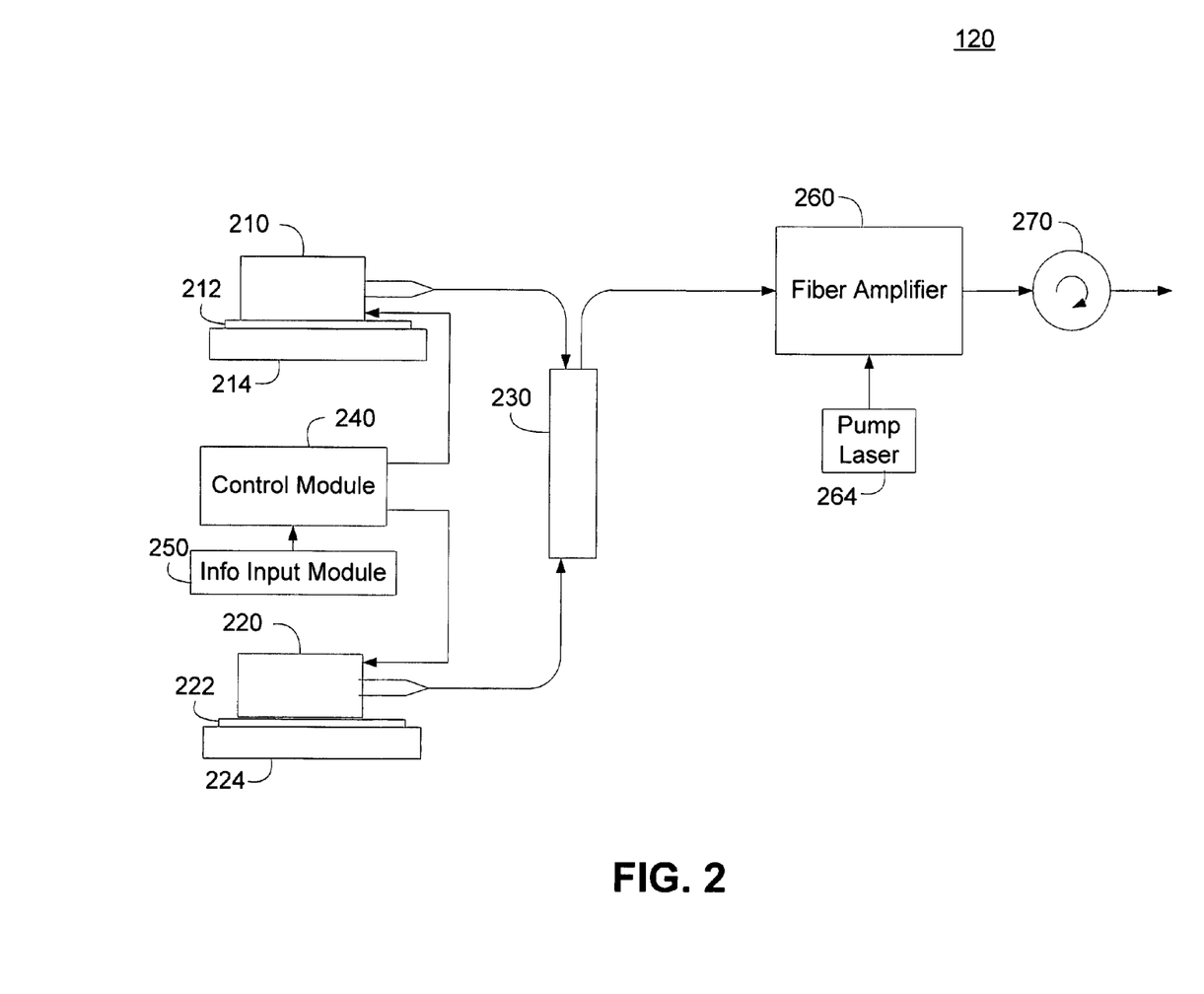
FIG. 2 is a simplified functional block diagram of an embodiment of an optical signal generator.

FIG. 2 is a simplified functional block diagram of an embodiment of an optical transmitter 120, such as a transmitter that can be used in the free space optical communication system 100 of FIG. 1. The optical transmitter 120 can be, for example, configured for use in a portable environment such as for an DOT system.

The optical transmitter 120 can include a first optical source 210, such as a first laser, operating substantially at a first wavelength. The first optical source 210 can be cooled using a combination of active and passive cooling elements. For example, the first optical source 210 can be cooled using a first thermal electric cooler (TEC) 212 that is thermally coupled to a first heatsink 214.

The optical transmitter 120 can also include a second optical source 220, such as a second laser, operating substantially at a second wavelength that is distinct from the first wavelength. The second optical source 220 can be cooled using a combination of a second TEC 222 that is thermally coupled to a second heatsink 224. A control module 240 can be coupled to the first and second optical sources 210 and 220 to control the operation of the optical sources. For example, the control module 240 may be configured to provide a bias current to one of the optical sources and restrict the current to the other optical source. The control module can also convert inputs from the input information module 250 to current signals that encode information onto an outgoing pulse stream from the combined source. Similarly, the control module 240 can be configured to selectively activate the first and second TECs 212 and 222 if TECs are included in the system. For example, the control module 240 may deactivate a TEC corresponding to an optical source that is similarly deactivated in order to conserve power.

The output of the first optical source 210 can be coupled to a first input of an optical combiner 230. Similarly, the output of the second optical source 220 can be coupled to a second input of the optical combiner 230. The optical combiner 230 can be configured to combine the output from the first and second optical sources 210 and 220 into a single output. In one embodiment, the optical combiner 230 can be an optical coupler and can combine the optical signals from the first and second optical sources 210 and 220 into a single combined optical signal. In another embodiment, the optical combiner 230 can be a wavelength division multiplexer (WDM) that is configured to receive the two distinct optical signals at the two distinct wavelengths and combine them into a single optical signal having components at each wavelength. The use of a WDM may be advantageous over a wideband coupler because the WDM may have a lower optical loss relative to a wideband optical coupler.

The output of the optical combiner 230 can be coupled to an optical amplifier. The optical amplifier can be configured, for example, as a Master Oscillator Power Amplifier (MOPA). The MOPA can include a fiber amplifier 260 that is pumped by an optical pump such as a pump laser 264. The fiber amplifier 260 can be configured to operate at least at the first and second wavelengths corresponding to the optical outputs of the first optical source 210 and the second optical source 220, respectively.

In one embodiment, a fiber grating normally positioned at the input of the fiber amplifier 260 can be omitted where data rates greater than about 50 kHz are used. In such an embodiment, the Amplified Spontaneous Emission (ASE) from the fiber amplifier 260 is reduced due to the higher operating data rates. Other embodiments may include a fiber grating (not shown) at the input of the fiber amplifier 260.

The output from the fiber amplifier 260 can be coupled to an optical circulator 270, such as a fiber circulator. The optical circulator 270 can be used to achieve high gain and peak powers from the fiber amplifier 260 that result in efficient lasing.

In one embodiment, the optical transmitter 120 can be used in a DOT system that is specified to operate in a temperature environment that ranges from −40° C. to +70° C. In a quantum well electro absorption optical modulator, the characteristic response may shift over temperature. The shift in the characteristic response of the quantum well modulator can be compensated, at least in part, by applying a DC bias to the quantum well modulator. However, over a wide ranging temperature span, such as the specified temperature range, the DC bias to compensate for the shift in the characteristic response of the quantum well modulator may represent a relatively large portion of the breakdown voltage associated with the optical modulator. For example, compensating an optical modulator over the temperature range of −40° C. to +70° C. may require application of a DC bias in excess of 65 volts (based on InP temperature sensitivity of ~0.62 nm/C).

The modulating signal needs to be supplied to the quantum well modulator in addition to the DC bias signal. The magnitude of the modulating signal is determined by the characteristics of the quantum well modulator in conjunction with the desired depth of modulation. In a typical electro absorption quantum well modulator, a modulating signal of approximately 30 volts AC is required to achieve a 2-way modulation depth of approximately 8 dB at a rate up to 5 MHz. Thus, the peak voltage experienced by the modulator is the sum of the DC bias and the magnitude of the AC modulating signal and can be in excess of approximately 80 volts at a temperature of +20° C. and approximately 92 volts at −40° C. It is difficult to achieve a quantum well modulator having a breakdown voltage that is in excess of 90 volts. The production yields on quantum well modulator having the ability to withstand this level of breakdown voltage is low.

The optical transmitter 120 embodiment of FIG. 2 substantially eliminates the need for quantum well modulator having breakdown voltages in excess of approximately 90 volts. In the optical transmitter 120 embodiment of FIG. 2, the breakdown voltage requirements of the quantum well modulator are relaxed by varying the operating wavelength of the optical signal. The wavelength of the optical source is varied to compensate for the shift in the characteristic response of the quantum well modulator. The operating wavelength is increased when the characteristic of the quantum well modulator is temperature shifted towards higher wavelengths. Similarly, the operating wavelength at the transmitter is reduced when the characteristic of the quantum well modulator shifts to lower wavelengths.

The optical transmitter 120 embodiment of FIG. 2 uses two distinct wavelengths. However, the transmitter 120 is not limited to a variable wavelength optical sources having two discrete wavelengths. An alternative embodiment can use additional optical sources, or may use one or more optical sources having continuously variable operating wavelengths. Still other embodiments may combine one or more distinct wavelength optical sources with one or more tunable optical sources having variable operating wavelengths.

A single tunable laser having an operating wavelength that varies over approximately 100 nm can be used in place of the combination of distinct fixed wavelength lasers to greatly relax the DC bias requirements of the quantum well modulator. However, use of such a tunable laser is not practical because substantial time can be expended searching for the optimum wavelength. In the DOTs system, the cost, form factor, and power consumption of a tunable laser makes use of a tunable laser impractical.

In the embodiment of FIG. 2, the first optical source 210 can be a Distributed Feedback (DFB) laser operating at substantially 1562 nm. The second optical source 220 can be, for example, a DFB laser operating at substantially 1532 nm. The operating wavelengths of the first and second optical sources 210 and 220 can be maintained within a predetermined optical band. For example, the operating wavelengths can be specified to be within ±1 nm of a specified operating wavelength. The TEC can be used to maintain the temperature of the corresponding DFB laser to within a limited range that allows the optical transmitter 120 to maintain the wavelengths of the DFB lasers within the specified range over the entire temperature range.

The optical transmitter 120 of FIG. 1 can operate by initially determining the operating wavelength. The control module 240 can be configured to perform a search routine or process in order to determine the more advantageous operating wavelength. In the search mode, the transmitter 120 can be configured to send out a message that wakes the Tag. The optical signal can be modulated with the proper information to allow the receiver at the Tag to verify that the incident optical signal originated from an authorized interrogator. The search message can be sent multiple times during a dwell time on a Tag. In one embodiment, the operating wavelength can be switched each time the message is sent. In another embodiment, the transmitter can vary the wavelength according to some predetermined algorithm or sequence.

The detector in the receiver of the Tag can have sufficient bandwidth to respond equally well to the multiple source operating wavelengths. When a message is received, the Tag receiver can activate the quantum well modulator to encode the response onto an incoming carrier pulse train that is a part of the transmitter's search message. The Tag controller or modulator drive module can use the temperature measured by an onboard sensor to provide the desired bias voltage to the quantum well modulator. The result can be that the quantum well modulator Tag can properly modulate the pulses at one of the source wavelengths but not the other. The detector in the receiver at the source can therefore receive a return message from the Tag at only one of the alternating wavelengths. The control module 240 can determine the desired operating wavelength based on the wavelength of the return message. Once a return message has been received, the transmitter can use the successful wavelength for subsequent communications with that Tag.

The control module 240 can activate one of the optical sources 210 or 220 based on the return message. For example, if the Tag is in an environment that is at a temperature higher than a first predetermined threshold, the control module 240 may activate the first optical source 210 and its associated TEC 212. The control module 240 may deactivate the second optical source 220 and its associated TEC 222 in order to conserve power.

If the control module 240 determines that the temperature at the Tag falls below the first predetermined threshold, for example, by determining that the return message occurs at the second operating wavelength, the control module 240 can deactivate or otherwise reduce the bias applied to the first optical source 210 and associated TEC 212 and can activate the second optical source 220 and associated TEC 222.

The first and second predetermined thresholds at the Tag can be selected to allow for some level of hysteresis in the control module 240 such that the optical transmitter 120 does not rapidly alternate between optical sources. For example, the Tag may use a second predetermined temperature threshold that is greater than the first predetermine threshold, and the control module at the transmitter may not transition operation back to the first optical source 210 until the temperature exceeds the second predetermined temperature threshold. Thus, upon initial power up or activation, the control module 240 may select the first optical source 210 if the temperature exceeds the first predetermined temperature threshold. However, if the temperature falls below the first temperature threshold, the control module 240 transitions operation to the second optical source 220, but does not return to the first optical source 210 unless the temperature exceeds the second temperature threshold.

In a typical DOTs system operation, the connection between an interrogator and the Tag receiver lasts for a time that is very short compared to the time of temperature changes. Therefore, there is typically no need to change the wavelength during any connection after the initial search period.

Figure 3:
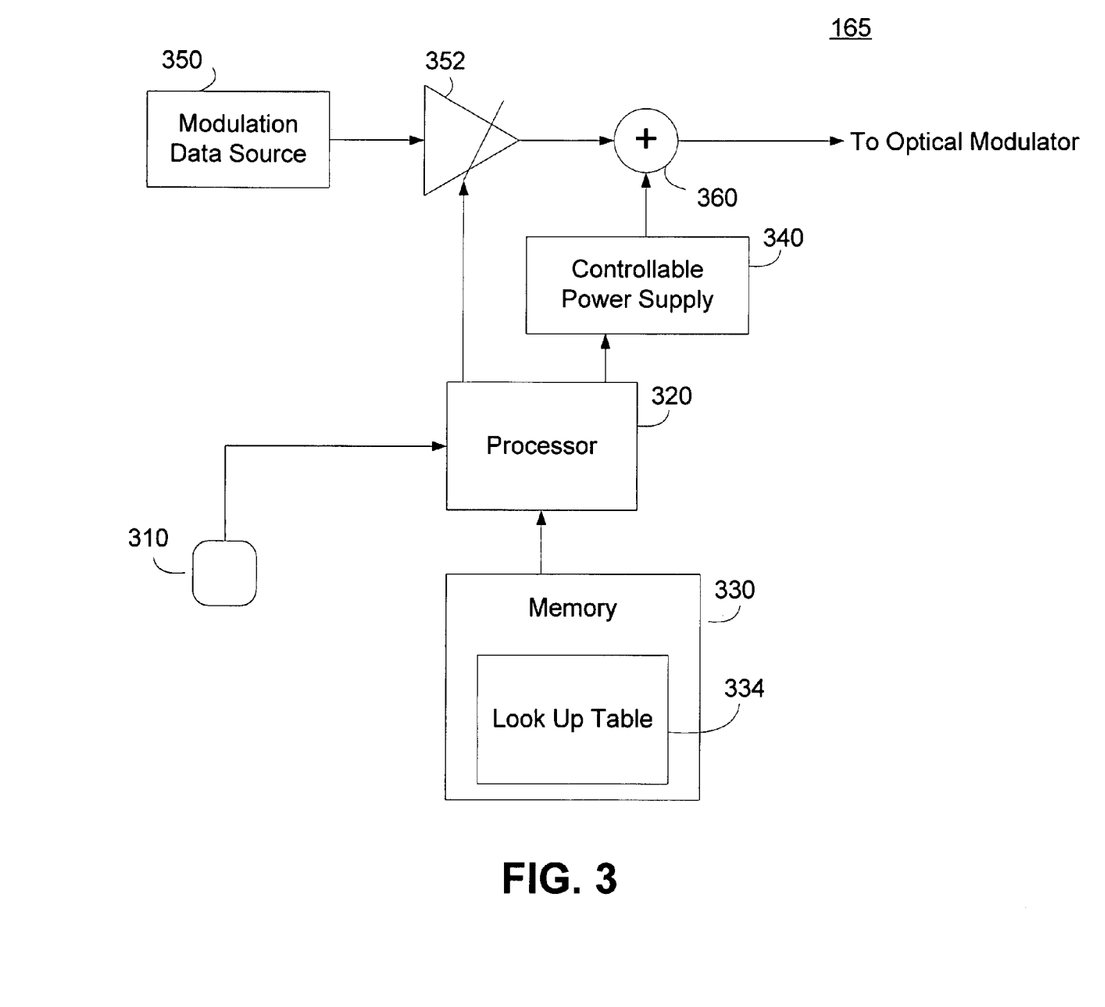
FIG. 3 is a simplified functional block diagram of an embodiment of a modulator drive module.

FIG. 3 is a simplified functional block diagram of an embodiment of a modulator drive module 165. The modulator drive module 165 can be configured to determine the proper DC bias and magnitude of an AC modulating signal over temperature when a variable wavelength optical source is used to provide the optical signal to the quantum well modulator. As shown in the transmitter embodiment of FIG. 2, the variable wavelength optical source can be configured as an optical source that is configured to alternately provide one of two distinct wavelengths.

The modulator drive module 165 includes a temperature sensor module 310 that can include one or more temperature sensors. The temperature sensors can be, for example, temperature sensitive diodes, junctions, resistors, current sources, a combination of temperature sensitive components and devices, and the like, or some other temperature sensitive element. The temperature sensor module 310 can determine, for example, the temperature of the optical modulator.

A processor 320 can be coupled to the temperature sensor module 310 and can be configured to read or otherwise determine the temperature based on outputs from the temperature sensor module 310. The temperature sensor module 310 can be configured, for example, to output temperature sensor readings in a digital format, such as a serial or parallel byte or word.

The processor 320 can be coupled to memory 330 that can include one or more storage devices. The memory 330 can store one or more processor usable instructions in the form of software that can be accessed and executed or otherwise used by the processor 320. The memory 330 can also include one or more memory locations configured as a look up table 334. The look up table 334 can be configured, for example, to store a DC bias and associated AC magnitude or amplifier gain corresponding to a plurality of temperatures or temperature ranges. For example, the complete temperature range can be divided into three sub-ranges and the look up table 334 can be configured to have a DC bias value corresponding to each of the sub-ranges. Of course, the look up table 334 is not limited to having only three temperature ranges, but may be configured to have as many temperature ranges as are considered sufficient for characterizing the modulator characteristic over the complete temperature range.

The processor 320 can be configured to access the look up table based in part on the temperature determined by the output signals from the temperature sensor module 310. The processor 320 can be coupled to a controllable power supply 340 and can control the controllable power supply 340 to provide a DC bias voltage appropriate for the temperature of the modulator. The output of the controllable power supply 340 can be coupled to a first input of a voltage combiner 360.

The processor 320 can also access the look up table 334 in memory 330 to determine a signal gain that can be used to provide a modulating signal of the desired magnitude. The processor 320 can set the gain of a variable gain amplifier 352 based on the values read from the look up table 334.

A modulation data source 350 can be configured to generate a modulation signal, receive a modulation data signal, or some combination of the two. In one embodiment, the modulation data source 350 can be configured to generate a repetitive modulating signal. Such a repetitive signal may be used in a system such as an IFF system where the information in the response is a fixed response. Alternatively, or additionally, the modulation data source 350 can be configured to receive a signal, for example a voice or data signal, and format it as a modulating signal. The output of the modulation data source 350 can be, for example normalized such that the range of the signal is bounded by a predetermined value. For example, the output of the modulation data source 350 can be a digital signal having a normalized amplitude, such as a pulse code modulated signal that is pulse position modulated or pulse width modulated.

The output of the modulation data source 350 can be coupled to an input of the variable gain amplifier 352. The AC magnitude of the signal output from the variable gain amplifier 352 can be varied by varying the gain of the amplifier. Thus, the processor 320 can vary the gain of the variable gain amplifier 352 to set the AC magnitude of the modulating signal. The output of the variable gain amplifier 352 can be coupled to a second input of the voltage combiner 360.

The voltage combiner 360 can be configured to combine the AC modulating signal with the DC bias and can couple the combined signal to the modulation input of the quantum well modulator (not shown). The voltage combiner 360 can be, for example, a signal summer or some other type of signal combiner. In one embodiment, the voltage combiner 360 can be as simple as an AC coupling capacitor that couples the AC modulating signal to the DC bias provided by the controllable power supply 340.

Table 1 provides the wavelengths and modulator bias requirements for an embodiment of a transmitter using two distinct wavelength DFB lasers operating at 1562 nm and 1532 nm. In the embodiment summarized in Table 1, the Quantum Confined Stark Effect (QCSE) for the modulator is 1.1 nm/V and the temperature sensitivity is 0.65 nm/V. The Exciton photoluminescence (PL) is 1507 nm at 20° C. A +22 nm shift results in the −1 dB insertion loss point.

TABLE 1

| Modulator's Temperature | Modulator's Exciton Wavelength | VAC Δ for Modular Insertion Loss change of 4 dB | DFB Laser Wavelength |
|---|---|---|---|
| +70° C. | Exciton shifts up to 1540 nm due to temp change No DC bias is required +22 nm operation brings to −1 dB point at 1562 nm | At 1562 nm w/40 VAC Δ | Optical source #1 used at 1562 nm +/− |
| +20° C. | Exciton shifts up to 1540 from 1507 nm due to 30 VDC bias +22 nm brings it to −1 dB point at 1562 nm | At 1562 nm w/30 to 60 VAC (30 VAC Δ) | Optical source #1 used at 1562 nm +/− |
| −40° C. | Exciton shifts down to 1468 nm due to 60 C. delta temperature change but 38 VDC bias brings it up to 1510 nm | At 1532 nm w/38 to 66 VAC (28 VAC Δ) | Optical source #2 used at 1532 nm +/− |

TABLE 1-continued

| Modulator's Temperature | Modulator's Exciton Wavelength | VAC Δ for Modular Insertion Loss change of 4 dB | DFB Laser Wavelength |
|---|---|---|---|
| | +22 nm brings it to −1 dB point at 1532 nm | | |

Figure 4A:
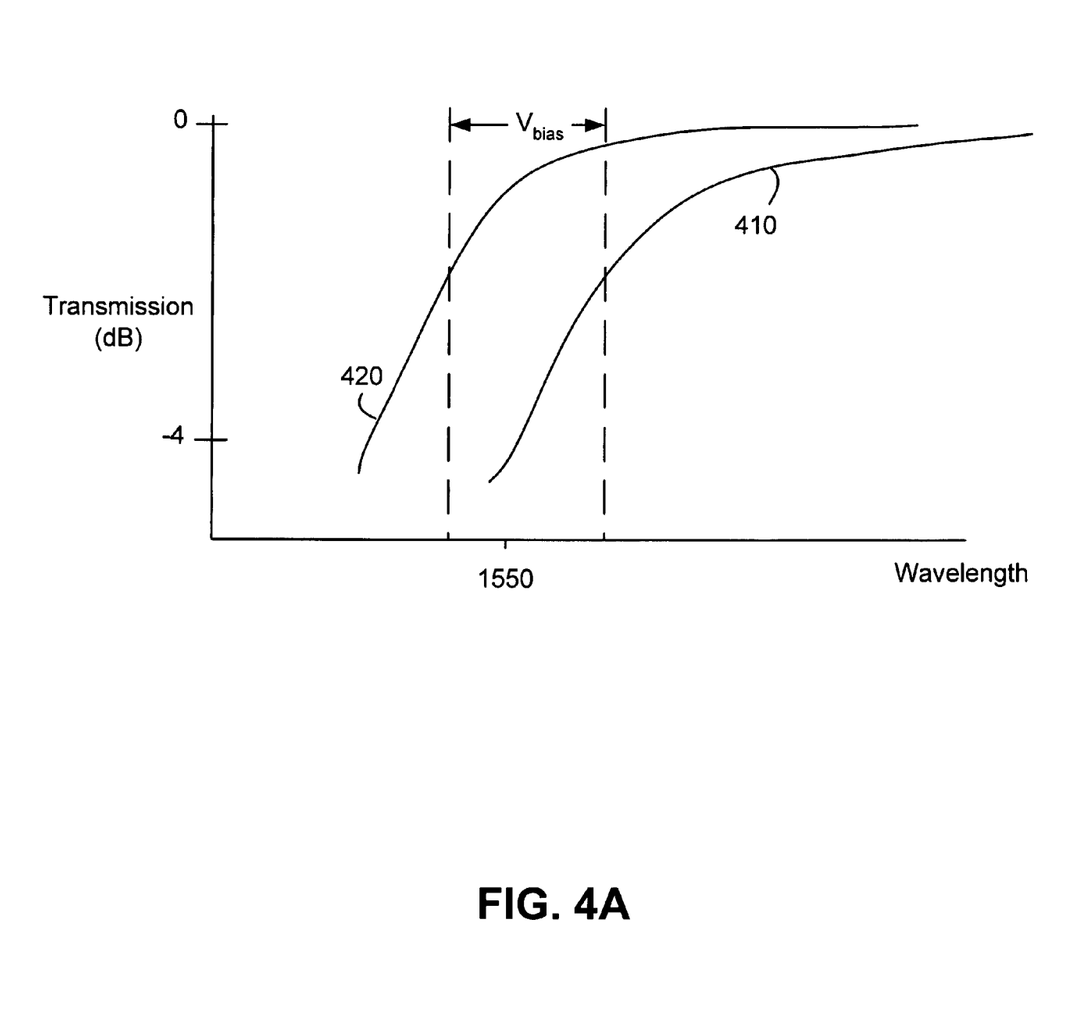
FIG. 4A is a simplified graph of a response curve for an embodiment of an optical modulator.

FIG. 4A is a graph illustrating a response curve for an embodiment of an optical modulator. The response curve can represent, for example, a response of a particular optical modulator at a particular temperature. A first response curve 420 can represent the response of the optical modulator at a particular temperature and having no applied DC bias. The second response curve 410 can represent the response of the optical modulator at the same temperature but with an applied voltage bias. The second response curve 410 is illustrated as substantially identical to the first response curve 420. However, in some embodiments, the application of a voltage may also change the shape of the response curve. Thus, applying a voltage bias to the modulator can affect the response of the modulator at a particular wavelength and a particular temperature. It can be seen that the voltage will shift the response curve by a fixed amount if the magnitude of the voltage bias represents the DC bias applied to the modulator. Alternatively, the response curve can shift between the two response curves if the voltage bias represents the magnitude of an AC signal, such as a digital signal, applied to the modulator. The depth of the modulated signal can be based in part on the differences between the response curves.

Figure 4B:
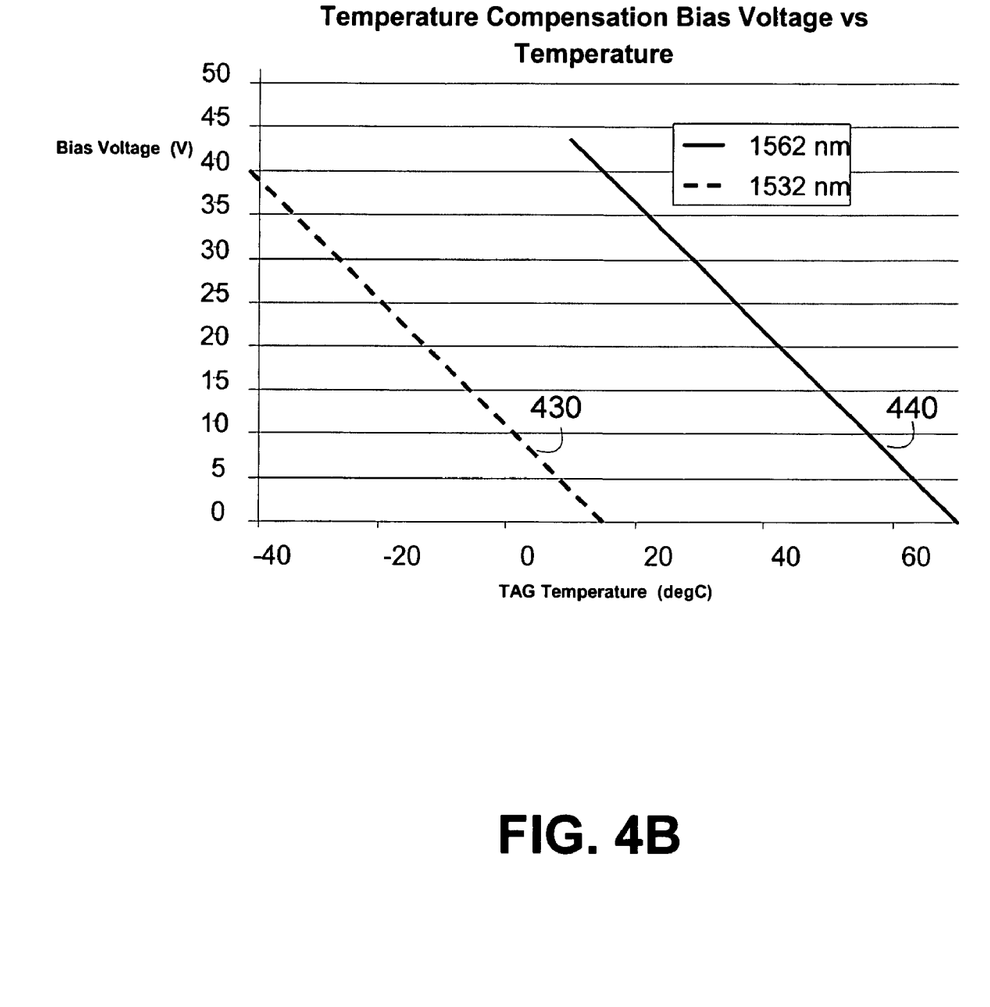
FIG. 4B is a simplified graph illustrating an example of temperature compensation bias voltage curve.

FIG. 4B is a graph illustrating an example of temperature compensation bias voltages for a transmitter in which the variable wavelength optical source includes two discrete lasers operating at two distinct operating wavelengths. A first laser can be configured to operate at substantially 1562 nm and a second laser can be configured to operate at substantially 1532 nm.

A first portion 440 of the temperature bias curve can be used for temperatures greater than about +15° C. At these temperatures, the quantum well modulator can be biased to operate with the 1562 nm source. At a temperature of approximately +70° C., the modulator drive module can be configured to provide essentially zero volts of DC bias. Alternatively, at a temperature slightly greater than +15° C., for example +20° C., the quantum well modulator is still configured for operation at 1562 nm. However, the modulator drive module is configured to provide about 38 volts of DC bias in order to shift the response of the quantum well modulator to 1562 nm.

A second portion 430 of the temperature bias curve can be used for temperatures less than about +15° C. At these temperatures, the quantum well modulator can be biased to operate with the 1532 nm source. At a temperature of approximately +15° C., the modulator drive module can be configured to provide essentially zero volts of DC bias. Alternatively, at a temperature slightly greater than −40° C., the modulator drive module is configured to provide about 40 volts of DC bias in order to shift the response of the quantum well modulator to 1532 nm. Thus, by using two discrete operating wavelengths, the maximum DC bias voltage applied to the quantum well modulator can be reduced to about 40 volts.

Figure 5:
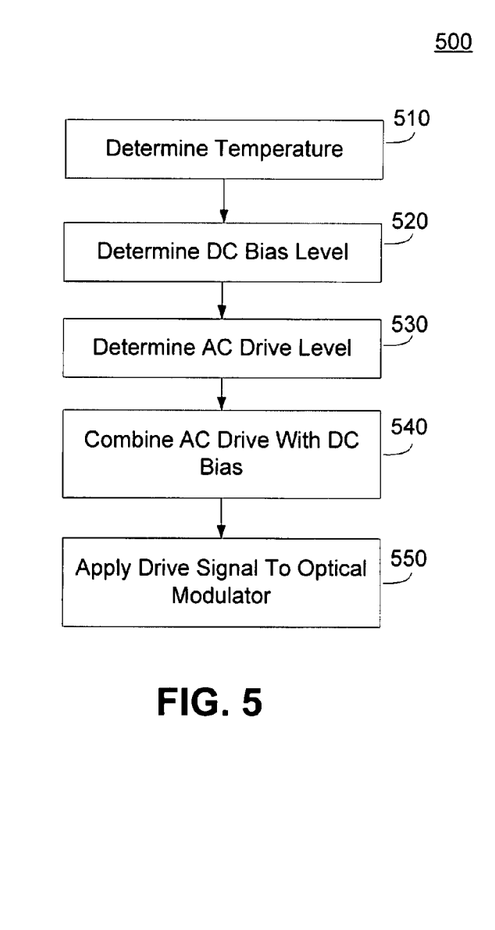
FIG. 5 is a simplified flowchart of an embodiment of a method of generating a modulated optical signal.

FIG. 5 is a simplified flowchart of an embodiment of a method 500 of generating a modulated optical signal. The method 500 can be performed, for example, by the retro-modulator in the second transceiver of FIG. 1. In particular, the method 500 can be performed by the modulator drive module 165 of FIG. 3 in combination with the quantum well modulator 195 positioned on the corner cube reflector 190.

The second transceiver of FIG. 1 can perform the method 500, for example, in response to receiving an interrogation signal at the receiver and determining that the signal originated from an authorized interrogator. In such an embodiment, the method 500 may be preceded by the actions of receiving an optical interrogation signal, and determining that the optical interrogation signal originated from an authorized source.

The method 500 begins at block 510 where the modulator drive module determines the temperature. The temperature typically refers to the temperature of an optical modulator within the Tag. However, the Tag may be sufficiently compact that any temperature sensor positioned on the Tag provides a sufficient sample of the temperature of the modulator.

Once the modulator drive module determines the temperature of the quantum well modulator, the modulator drive module can proceed to block 520 and determine the level of DC bias that needs to be applied to the modulator to shift a portion of the response curve of the modulator to the desired optical wavelength. The modulator drive module 165 can, for example, access a look up table in memory that stores a DC bias value corresponding to each of a plurality of temperature ranges.

The modulator drive module 165 can then proceed to block 530 and determine the magnitude of the AC modulating signal. The modulator drive module 165 can also have AC magnitudes or values that represent or otherwise correspond to AC magnitudes stored in a look up table. In one embodiment, the look up table can include AC magnitudes corresponding to one or more temperature ranges that can be the same or distinct from the one or more temperature ranges used to determine the DC bias. In another embodiment, the look up table can store the values of amplifier gain or bias voltage to apply to a gain input of a variable gain amplifier. Other embodiments can have other look up table embodiments. Alternatively, the DC bias and AC magnitude can be determined by a function or a function in combination with look up table values. For example, the look up table can store parameters for a polynomial curve fit to the DC bias values or the AC signal magnitude and a processor can use the parameters to determine the DC bias or AC magnitude based in part on the temperature.

After determining the DC bias and AC magnitude corresponding to the temperature, the modulator drive module 165 proceeds to block 540 and combines the AC and DC signals to a single modulating signal. For example, the modulator drive module 165 can AC couple the AC modulating signal onto the DC bias voltage. The modulator drive module 165 can then proceed to block 550 and apply the composite signal to the optical modulator to modulate the optical signal to a desired modulation depth and at the desired wavelength.

Figure 6:
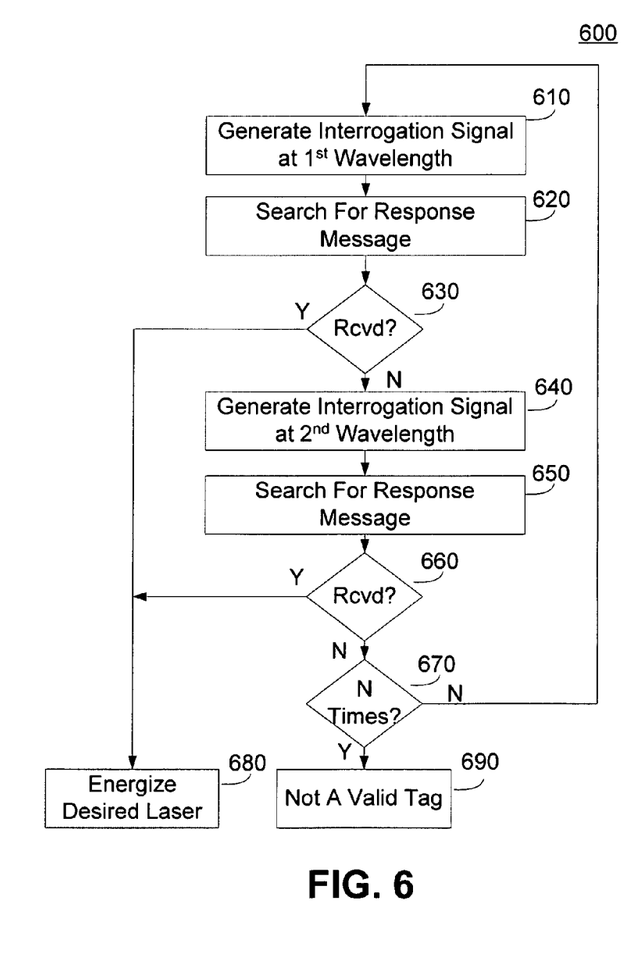
FIG. 6 is a simplified flowchart of a method of generating a variable wavelength optical signal.

FIG. 6 is a simplified flowchart of a method 600 of generating a variable wavelength optical signal. The embodiment of FIG. 6 can be performed, for example, by the transmitter of FIG. 2 using two optical sources having distinct operating wavelengths. The method 600 can be implemented to search for the desired operating wavelength of a Tag to which the transmitter wishes to communicate. The method 600 corresponds to a transmitter embodiment using two distinct laser sources.

The method 600 begins at block 610 where the transmitter generates an interrogation signal at the first wavelength. The transmitter can energize the first laser, for example, by applying a desired current to the laser. The transmitter can also energize a TE cooler corresponding to the activated optical source. The TEC can be used to maintain the laser within a predetermined temperature range, and thus maintain the laser wavelength within a predetermined range of wavelengths. The transmitter can, for example, de-energize any other optical source, such as the second laser, in order to minimize power consumption. The transmitter can also modulate the optical signal with the interrogation signal by pulsing the laser current according to the interrogation signal. The transmitter can then amplify the signal and transmit the signal over the optical channel.

The transmitter can proceed to block 620 and monitor the optical channel for the response message. The transmitter proceeds to decision block 630 to determine if the response message is successfully received by the receiver. If the receiver receives the response message, the transmitter proceeds to block 680 and energizes the desired laser corresponding to the first laser.

If, at decision block 630, no response message is detected, the transmitter proceeds to block 640 and the transmitter generates an interrogation signal at the second wavelength. The transmitter proceeds to block 650 and monitors the optical channel for the response message. The transmitter proceeds to decision block 660 to determine if the response message is successfully received by the receiver. If the receiver receives the response message, the transmitter proceeds to block 680 and energizes the desired laser corresponding to the second laser.

If, at decision block 660, no response message is detected, the transmitter proceeds to block 670 and determines if a predetermined number of interrogation signals have been transmitted. If so, the transmitter proceeds to block 690 and determines that the Tag is not a valid Tag. If, at decision block 670, the transmitter determines that less than the predetermined number of interrogation signals have been transmitted, the transmitter returns to block 610.

An optical transmitter and method of generating a modulated optical signal for a DOT system that is configured to operate over an extended temperature range is disclosed. The transmitter can use a variable wavelength optical source whose operating wavelength is controlled to reduce a DC bias applied to a quantum well optical modulator. The DC bias applied to the optical modulator operates to shift the response curve of the optical modulator to a desired wavelength. The response curve of the optical modulator can shift as a function of temperature and the wavelength of the variable wavelength optical source can be shifted to compensate, at least in part, the temperature shift of the optical modulator due to temperature. The variable wavelength optical source can be generated using a plurality of optical sources operating at distinct wavelengths. The operating wavelength can be controlled by selecting or activating the optical source corresponding to the desired wavelength.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

The steps of a method, process, or algorithm described in connection with the embodiments disclosed herein may be embodied directly in hardware, in a software module executed by a processor, or in a combination of the two. The various methods may be performed in the order shown in the embodiments or may be performed using a modified order of steps. Additionally, one or more process or method steps may be omitted or one or more process or method steps may be added to the methods and processes. An additional step, block, or action may be added in the beginning, end, or intervening existing elements of the methods and processes.

What is claimed is:

1. An apparatus for use in an optical communication system, the apparatus comprising:
   a first laser having an output and configured to operate at a first wavelength;
   a second laser having an output and configured to operate at a second wavelength distinct from the first wavelength;
   a signal combiner configured to couple the output of the first laser and the output of the second laser to a combiner output;
   a control module configured to selectively activate one of the first laser and the second laser; and
   an optical receiver configured to receive a response message at one of the first wavelength and the second wavelength and the optical receiver is configured to receive a reflection of at least a portion of an output from the first laser or the second laser, wherein the control module selects the first laser for further communication if the response message is received at the first wavelength, the control module selects the second laser for further communication if the response message is received at the second wavelength, and the reflection comprises a retro-modulated optical signal.

2. An apparatus for use in an optical communication system, the apparatus comprising:
   a temperature sensor configured to measure the temperature at or near the optical communication system;
   a quantum well modulator having a modulation input;
   a corner cube reflector having the quantum well modulator positioned on a front surface, the corner cube reflector being configured to reflect an optical signal toward the source of the optical signal; and
   a modulator drive module coupled to the quantum well modulator and configured to apply a DC bias to the modulation input based on a temperature measured by the temperature sensor, the applied DC bias being sufficient to modulate an optical signal at the quantum well modulator with a first wavelength and the applied DC bias being insufficient to modulate an optical signal at the quantum well modulator with a second wavelength.

3. The apparatus of claim 2, wherein the modulator drive module comprises:
   a controllable power supply having a DC output; and
   a processor coupled to the temperature sensor and a control input of the controllable power supply and configured to set the controllable power supply to the DC bias based on the temperature monitored by the temperature sensor.

4. The apparatus of claim 2, wherein the modulator drive module comprises:
   a modulation data source having an AC modulation signal; and
   a combiner coupled to the modulation data source and configured to combine the AC modulation signal with the DC bias.

5. The apparatus of claim 2, wherein the modulator drive module is configured to control a magnitude of an AC modulating signal applied to the optical modulator based in part on the temperature.

6. The apparatus of claim 5, wherein the modulator drive module is further configured to combine the AC modulating signal with the DC bias signal.

7. A method of generating an optical output, the method comprising:
  receiving a first optical signal with a first wavelength;
  receiving a second optical signal with a second wavelength;
  monitoring a temperature;
  controlling a DC bias for an optical modulator based in part on the temperature the DC bias being sufficient to modulate the first optical signal and the DC bias being insufficient to modulate the second optical signal; and
  applying a modulating signal having the DC bias to the optical modulator.

8. The method of claim 7, further comprising:
  determining a magnitude of an AC signal component based in part on the temperature; and
  combining the AC signal component with the DC bias to generate the modulating signal.

9. The method of claim 7, wherein controlling the DC bias comprises accessing a look up table to determine the DC bias based on the temperature.

* * * * *

UNITED STATES PATENT AND TRADEMARK OFFICE
CERTIFICATE OF CORRECTION

PATENT NO.      : 7,603,041 B2                                    Page 1 of 1
APPLICATION NO. : 11/150828
DATED           : October 13, 2009
INVENTOR(S)     : Varshneya et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1056 days.

Signed and Sealed this

Fifth Day of October, 2010

David J. Kappos
*Director of the United States Patent and Trademark Office*